Feb. 7, 1967          C. J. MOORE ETAL          3,303,474
       DUPLEXING SYSTEM FOR CONTROLLING ON-LINE AND STANDBY
                    CONDITIONS OF TWO COMPUTERS
Filed Jan. 17, 1963                              3 Sheets-Sheet 3

Fig. 3.

- 82 BOTH ON-LINE
- 52 DOWN
- 77 INTERLOCKS
- 87 COMP. 2 IN STANDBY
- 65 GO ON-LINE, EMERGENCY
- GO ON-LINE, NORMAL 56
- NOT STANDBY 59

92, 93, 94, 95, 96

91 ERROR LEVEL

OPERATOR RESET

Fig. 4.

AND   OR   INVERTER   DELAY

FLIP-FLOP

INVENTORS
CLARENCE J. MOORE &
STEPHEN W. LEIBHOLZ
BY
Carl V. Olson
ATTORNEY

United States Patent Office 3,303,474
Patented Feb. 7, 1967

3,303,474
DUPLEXING SYSTEM FOR CONTROLLING ON-LINE AND STANDBY CONDITIONS OF TWO COMPUTERS
Clarence J. Moore, Philadelphia, and Stephen W. Leibholz, Hatboro, Pa., assignors to Radio Corporation of America, a corporation of Delaware
Filed Jan. 17, 1963, Ser. No. 252,221
13 Claims. (Cl. 340—172.5)

This invention relates to computer duplexing systems wherein either one of two computers may operate on-line in relation to one common set of peripheral input-output devices. More particularly, the invention relates to means for monitoring the on-line and standby conditions of the two computers, and for automatically changing the operating conditions of the computers in the event of a malfunction.

While not limited thereto, the invention is particularly useful in a computer system which deals with large amounts of input and output information. An example of such a computer system is one used at a communication message switching center where incoming messages on communications channels are recorded, analyzed for destination, priority, etc., and are sent out on appropriate communications channels. In such a real-time application, the malfunctioning of a computer (i.e., the communication data processing portion of the system) may disable the system so that none of the received messages, including high priority messages, are forwarded to their destinations. A high degree of protection against interruption of service can be provided by employing two computers in a duplex arrangement wherein one computer is in the on-line condition and the other computer is in the standby condition for use in the event of failure of the on-line computer.

It is a general object of this invention to provide an improved computer duplexing arrangement wherein the operating conditions of two computers are monitored and automatically controlled to minimize the probability of an interruption of the real-time functioning of the system.

It is another object of the invention to provide an improved computer duplexing ararngement including an automatic duplexing control unit having provisions for detecting malfunctions within itself, and thereupon directing the computers to ignore it.

According to an example of the duplexing system of the invention, two computers are each provided with validation pulse generating means under program control for generating program validation pulses indicative of on-line, standby and failed conditions in the respective computers, program interrupt means, command and status means for controlling the operation of the computer after its previous program is interrupted, and input-output switches for connecting common input-output devices with one or the other of the computers. A duplexing control unit is connected to receive the program validation pulses from both computers, and is operative to detect a change in operating conditions in a computer, and in response therto to apply interrupt signals to the program interrupt means of the computers, to apply command and status signals to the command and status means in the computers, and to apply interlocked enabling signals to the input-output switches.

In the drawings,

FIG. 3 is a logic diagram of the error circuit in the duplexing control unit of FIGS. 1 and 2, the error circuit being operative to recognize malfunctions within itself and to thereafter relinquish its control over the computers; and FIG. 4 is a key giving the logic functions of the symbols shown in FIGS. 2 and 3.

*Description and operation of the system*

Figure 1:
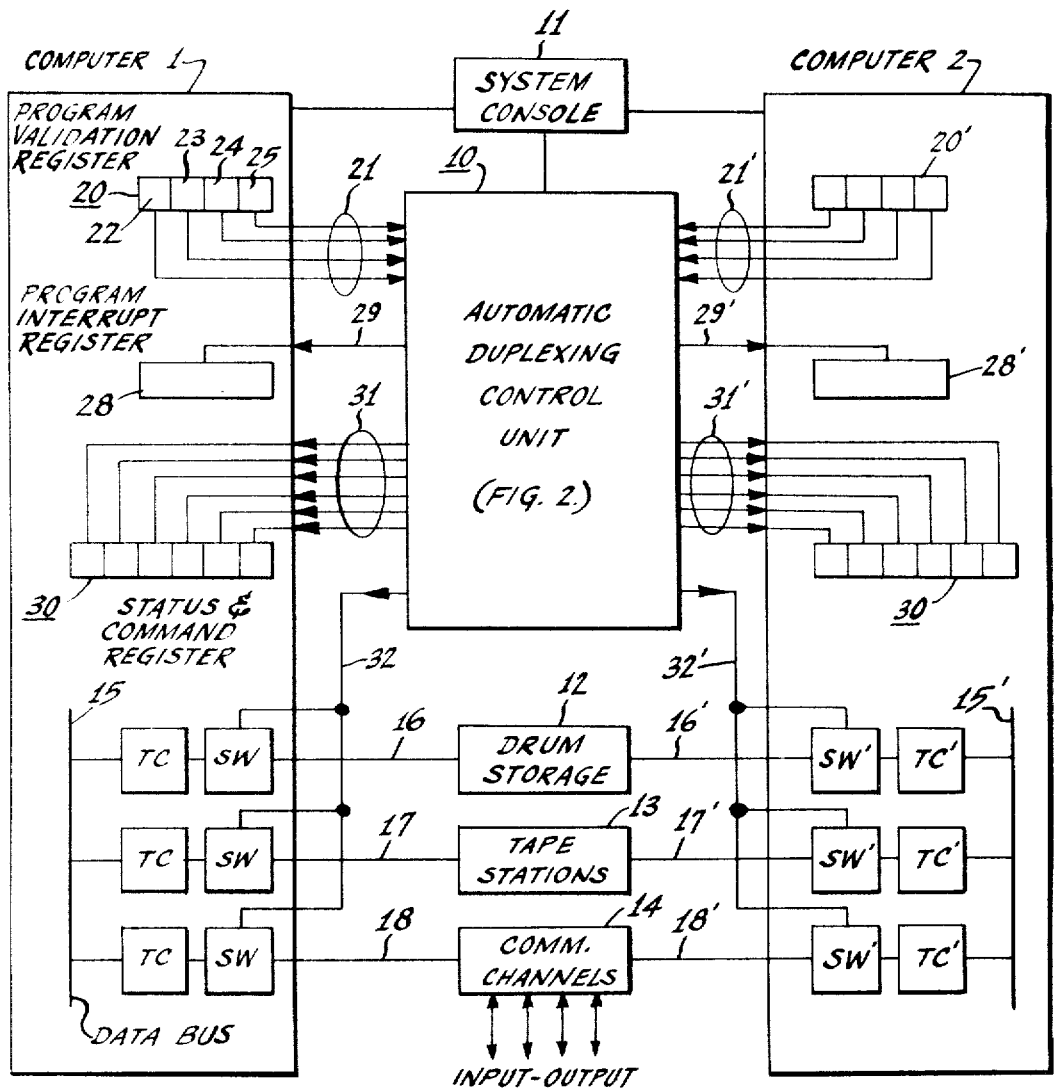
FIG. 1 is a block diagram of a duplexing arrangement of two computers for the reliable performance of a real-time function.

FIG. 1 illustrates a system according to the invention including a computer 1, a computer 2, an automatic duplexing control unit 10, a system console 11 connected with the previously-listed units, and peripheral devices, common to both computers, which are, by way of example, illustrated as a drum storage unit 12, tape stations 13 and communications channels 14. The system illustrated is a computer duplexing system for processing communication messages received and transmitted via the communications channels 14. The drum storage units 12 and the tape stations 13 are used for housekeeping and other functions in the performance of the stored programs in the computers.

Computer 1 (and computer 2 as well) includes the usual computing and data processing components (not shown) such as a high-speed memory, an arithmetic unit, registers, control unit, etc. Instruction and data words flow between the various units over a data bus 15. The data bus 15 is connected through buffers or transfer channels TC and peripheral device switches SW over buses 16, 17 and 18 to the peripheral devices 12, 13 and 14.

The computer includes a program validation signal register or generator 20 from which four signals are applied over lines 21 to the duplexing control unit 10. The program validation register or generator generates pulses as a result of the performance of instructions programmed into the computer by the programmer. In writing the program for the operation of the computer in performing its intended function, the programmer inserts instructions calling upon the computer to generate pulses at spaced intervals in the performance of the program. The programmer may thus insure that a pulse is generated at 22 at least once in every two seconds of a minor cycle of the program, that a pulse is generated at 23 at least once in every twenty seconds in the performance of a major cycle of the program, and that a pulse is generated at 24 at least once in every two seconds that the computer is in the programmed standby condition. The particular time periods employed are a matter of choice in the light of system requirements. Additionally, the programmer insures that a pulse will be generated at 25 whenever a malfunction occurs in the computer 1 which is of a character recognized as such by the computer in the performance of error checking procedures.

The computer also includes a program interrupt register or means 28 which operates to permit interruption of the performance of a stored program at intervals therein designated by the programmer and on the occurrence of a signal applied thereto over line 29. The program interrupt register 28 is a part of means in the computer, of known and commonly used character, for responding to an interrupt signal by transferring operation from the interrupted program to another program stored in the computer.

The computer also includes a status and command register 30 having bit locations to which status and command signals are applied over lines 31 from the duplexing control unit 10. The status and command register 30 contains information which controls the program followed by the computer after the program previously being performed was interrupted by the program interrupt register or means 28. The program previously being performed by a computer may be the on-line program or the standby program. The standby program need not be one of idleness, but may include the performance of various duties not requiring connection with the input-output channels 14. The functions performed by the six bit locations in the status and command register 30, following an interruption, will be described in connection with a description of FIG. 2.

The switches SW in the computer connecting the computers to the common peripheral devices 12, 13 and 14 are controlled by enabling signals applied over line 32 from the duplexing control unit 10.

What has been said regarding computer 1 applies also to computer 2. In computer 2, the elements corresponding to elements in computer 1 bear the same reference numerals with primes added. The automatic duplexing control unit 10 receives program validation signal pulses from both of computers 1 and 2, and supplies interrupt, and status and command signals to both of computers 1 and 2, and it also supplies interlocked switch-controlling signals to the switches SW, SW' in both computers 1 and 2.

*Description of the duplexing control unit*

Figure 2:
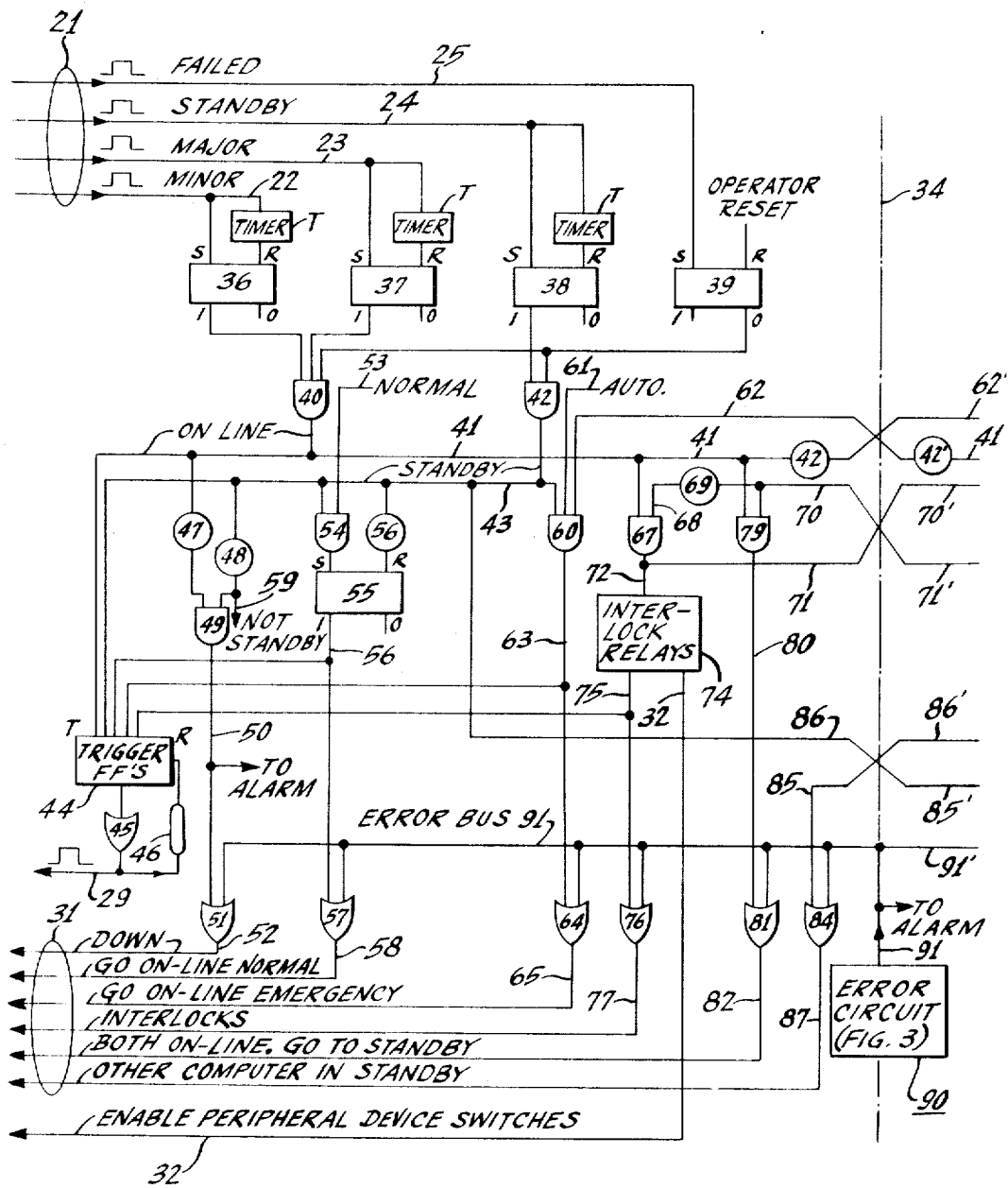
FIG. 2 is a logic diagram of the one-half of the automatic duplexing control unit (of FIG. 1) which is connected to computer 1, the other half connected to computer 2 being the mirror image of that shown in FIG. 2.

Reference is now made to FIG. 2 for a description of the automatic duplexing control unit 10 in FIG. 1. A key to the symbols is given by FIG. 4. FIG. 2 shows one half of the automatic duplexing control unit, namely, the half which is connected with computer 1. The other half (not shown) of the duplexing control unit, which is connected to computer 2, is to the right of the broken line 34 and is not shown because it is the mirror image of what is shown to the left of broken line 34.

Minor cycle, major cycle and standby signal pulses received on lines 22, 23 and 24, respectively, are applied directly to set inputs S of flip-flops 36, 37 and 38, respectively, and through timers T to the reset inputs R of the respective flip-flops. The timers T act to reset the flip-flops unless a new input is received by the timer before the time delay of the timer expires. The timers may be constructed in a usual manner to include a clock driven counter which is reset by an incoming pulse and which overflows to provide an output pulse only when another input pulse does not appear within the timing period of the counter. The arrangement is one wherein the flip-flops 36 and 37 remain in the set condition providing a "1" output level so long as computer 1 supplies minor cycle and major cycle pulses over leads 22 and 23; and wherein flip-flop 38 remains in the set state providing a "1" output level so long as computer 1 provides standby pulses over lead 24.

The line 25 for conveying a "failed" pulse is connected to the set input S of a flip-flop 39. The flip-flop 39 is normally reset as a result of an action by the operator, and is set only when a failure-indicating pulse is applied to the set input. The arrangement is one wherein a voltage level is available at the "0" output in the absence of a failure signal from computer 1.

An "and" gate 40 receives inputs from flip-flops 36, 37 and 39 and provides an output voltage level on on-line bus 41 when computer 1 is operating normally and is in its on-line condition. An "and" gate 42 receives inputs from flip-flops 38 and 39 and provides an output level on standby bus 43 indicating that computer 1 is in its standby condition.

Five triggerable flip-flops are represented by the box 44. Buses 41 and 43 are connected to trigger inputs of two respective ones of the triggerable flip-flops 44. The outputs of all of the triggerable flip-flops are applied to an "or" gate 45 having an output over line 29 to the program interrupt register 28 in computer 1. The output of "or" gate 45 is also applied through a delay 46 to the reset inputs R of all five of the triggerable flip-flops 44. The delay 46 determines the duration of the signal pulse on output lead 29 after any one of the flip-flops is triggered.

The buses 41 and 43 are connected through respective inverters 47 and 48 to inputs of an "and" gate 49 having an output 50 which is connected to an audible alarm for alerting the operator and to an "or" gate 51. The output of "or" gate 51 is connected over line 52 to the status and command register 30 in computer 1 for the purpose of indicating that computer 1 is down, meaning that computer 1 is neither on-line nor standing by.

The standby bus 43 and an operator-controlled line 53 is connected to inputs of an "and" gate 54 having an output connected to the set input S of a flip-flop 55. The standby bus 43 is also connected through an inverter 56 to the reset input R of flip-flop 55. The "1" output of flip-flop 55 is connected to the trigger input of a flip-flop 44 and to an input of an "or" gate 57. The output 58 of "or" gate 57 is connected to computer 1 for the purpose of commanding computer 1 to go on-line in a normal mode initiated by the operator.

An "and" gate 60 has inputs connected to the standby bus 43, an operator-controlled lead 61, and a lead 62 connected to the portion of the duplexing control unit which is to the right of broken line 34 and which is connected to computer 2. The signal level on line 62 is an inverted version of the on-line voltage level on bus 41', the inversion being performed by an inverter 42'. A signal level on line 62 indicates that computer 2 is not on-line. The output 63 of "and" gate 60 is connected to a triggerable flip-flop 44 and to an "or" gate 64. The output of "or" gate 64 is connected over line 65 to computer 1 for the purpose of commanding computer 1 to go on-line as a result of an emergency due to a malfunction.

An "and" gate 67 has an input connected to the on-line bus 41 and an input connected over a lead 68, an inverter 69 and a lead 70 to a lead 71' in the half of the control unit to the right of broken line 34. The output 72 of "and" gate 67 is connected through the line 71 to the line 70' in the other half of the control unit, and is connected to control interlock relays 74. Output 75 of relays 74 is connected to a triggerable flip-flop 44 and to an "or" gate 76. The output of "or" gate 76 is connected over line 77 to computer 1 for the purpose of indicating that computer 1 is connected to the peripheral devices. Another output 32 of the relays 74 is connected to the peripheral device switches SW in computer 1 for enabling the switches to connect the peripheral devices with the computer. The arrangement described is one performing an interlock function insuring that one, and only one, of the computers is connected with the peripheral devices.

An "and" gate 79 has an input connected to the on-line bus 41 and an input connected to the line 70, which is in turn connected to the line 71' in the other half of the control unit. The output 80 of "and" gate 79 is connected to an input of an "or" gate 81. The output of "or" gate 81 is connected over line 82 to computer 1 for the purpose of commanding computer 1 to go to the standby condition because both computers are in the on-line condition (not permitted) and because computer 2 is already connected with the peripheral devices.

An "or" gate 84 has an input connected over lines 85 and 86' to the standby bus 43' in the half of the control unit associated with computer 2. The output of "or" gate 84 is connected over line 87 to computer 1 for the purpose of indicating that computer 2 is standing by.

Description of the error circuit

An error circuit 90 has an output bus 91 connected to inputs of all of the "or" gates 51, 57, 64, 76, 81 and 84 in the half of the control unit associated with computer 1. The output bus 91 also extends as a bus 91' to all of the corresponding "or" gates 51', 57', 64', 76', 81' and 84' (not shown) in the other half of the control unit to the right of the broken line 34. The output 91 is also connected to an audible alarm for alerting the operator.

The error circuit 90 is constructed to detect malfunctions in the operation of the duplexing control unit itself, and to thereupon cause signals to be supplied on all of the lines 31 and 31' to the status and command registers 30 and 30' in the two computers. The programs stored in the two computers are designed to recognize this condition of the status and command registers as indicating a failure in the duplexing control unit, and to thereafter ignore all signals from the automatic duplexing control unit until the operator has corrected the malfunction.

The error circuit 90 in FIG. 2 is shown in detail in FIG. 3. The error circuit includes a logic network 92 having inputs 82, 52, 77, 87, 65, 56 and 59, all of which are connected to correspondingly designated leads in the duplexing control unit of FIG. 2. A second identical logic network 93 is provided with similar inputs 82', 52', 77', 87', 65', 56' and 59' from the half of the duplexing control unit to the right of the broken line 34 in FIG. 2 and associated with computer 2. All of the outputs of the logic networks 92 and 93 are connected through an "or" gate 94 and a pulse forming circuit 95 to the set input S of a flip-flop 96. The "1" output of the flip-flop 96 is applied to the error bus 91, 91'.

Operation of the duplexing control unit

The operation of the automatic duplexing control unit of FIG. 2 will now be described. If computer 1 is supplying minor cycle and major cycle pulses on leads 22 and 23, and if computer 1 has not supplied a "failed" pulse on lead 25, the conditions of flip-flops 36, 37 and 39 are such as to provide three signal level inputs to "and" gate 40 which enable it and energize the on-line bus 41. On the other hand, if computer 1 is supplying standby pulses on line 24 and has not supplied a "failed" pulse on line 25, the flip-flops 38 and 39 provide levels which enable "and" gate 42 and energize the standby bus 43.

If the voltage level on the on-line bus 41 is terminated for any reason, the corresponding flip-flop 44 is triggered, with the result that a pulse is sent over line 29 to the program interrupt register 28 in computer 1. Similarly, if the level on standby bus 43 is terminated, the corresponding flip-flop 44 is triggered, resulting in a pulse on line 29. The purpose and result of these actions is to interrupt the program being performed by the computer because there is a malfunction somewhere in the computer.

If computer 1 is not on-line as represented by an output from inverter 47, and is not standing by as represented by an output from inverter 48, the "and" gate 49 is enabled. This results in the energizing of an audible alarm and the sending of the "down" status signal through "or" gate 51 and line 52 to the status and command register 30 in computer 1. The program in computer 1 is designed to adjust itself to the status information thus provided.

If computer 1 is in the standby condition and the operator applies a signal to the "normal" terminal 53, the "and" gate 54 is enabled causing flip-flop 55 to be set so that it triggers a flip-flop 44 and supplies a "go on line, normal" signal over line 58 to computer 1. (The inverter 56 insures that the flip-flop 55 is reset when computer 1 is not in the standby condition.)

If the operator has supplied a voltage level to the "automatic" lead 61, indicating that he wishes to permit automatic operation of the control unit, and if computer 1 is in standby as represented by a level on lead 43, and if computer 2 drops from its on-line condition as represented by the occurrence of a voltage level on lead 62, then "and" gate 60 is enabled and it supplies a signal through "or" gate 64 and line 65 commanding computer 1 to go on-line automatically as a result of the emergency failure in computer 2. As before, a flip-flop 44 is also triggered.

A signal on line 72 from "and" gate 67 acts through interlock relays 74 and lead 32 to activate the peripheral devices switches SW so they connect computer 1 with the common peripheral devices. A voltage level exists on lead 72 when "and" gate 67 is enabled by a signal from the computer 1 on on-line bus 41 and a concurrent signal on line 68 indicating that computer 2 is not connected with the common peripheral devices. Therefore, the logic performed by the "and" gate 67, the inverter 69 and the connections thereto constitute an interlock which insure that one and only one of the computers is connected to the common peripheral devices. As before, a change in the voltage level on leads 72 and 75 causes the setting of a triggerable flip-flop 44.

If the "and" gate 79 receives an input from the on-line bus 41 indicating that computer 1 is on-line, and receives an input on line 70 indicating that computer 2 is connected to the common peripheral devices, the "and" gate 79 is enabled. The conditions indicate that both computers are on-line (not permitted). The enabled "and" gate 79 causes a signal through "or" gate 81 and line 82 to computer 1 commanding it to go to the standby condition.

If a signal level exists on line 85, which is connected through line 86' to the standby bus 43' associated with computer 2, the signal level is coupled through "or" gate 84 to the status and command register 30 in computer 1 where it indicates to computer 1 that computer 2 is in the standby condition.

The foregoing operational description sets forth how the validation signals from computer 1 result in an interrupt signal and status and command signals which are directed to computer 1 to logically control its functioning as one computer in a computer duplexing system. What has been said with regard to signals from and to computer 1 in the portion of the control unit shown in FIG. 2 applies also to the signals received from and applied to computer 2 by the half of the control unit (not shown) to the right of broken line 34. It is merely necessary, in the description, to transpose the words "computer 1" and "computer 2," and to transpose the unprimed and primed numerals, in order to describe the operation involving computer 2.

It is seen from FIG. 2 that the error circuit 90 supplies a signal from bus 91, 91' through all of the "or" gates to all of the status and command leads 31 and 31' going to both computers 1 and 2. Reference is now made to FIG. 3 for a description of malfunction conditions in the duplexing control unit which give rise to an error signal causing the computers to ignore the duplexing control unit. A signal level on line 82 indicating that both computers are on-line (not permitted), coincident with a signal level on line 52 indicating that computer 1 is "down," represents a logical inconsistency and malfunctioning in the duplexing control unit. The gates in the logic network 92 respond by supplying a signal through "or" gate 94, pulse generator 95 and flip-flop 96 to supply an error level signal to the error bus 91.

An error level signal is also generated by logic network 92 when lines 82 and 77 are both energized. The two signals are inconsistent and indicate a malfunction. Similarly, coincident signals on both of lines 82 and 87 represent a malfunction and result in an error signal. Other input signal combinations to logic network 92 which indicate malfunctions are apparent from the meaning of the input signals and the logical connections of the "or" and "and" gates in the network 92. The logic network 93 performs the same function in response to inputs from the other computer. When any pair of logically-inconsistent and malfunction-indicating signals is applied to networks 92 or 93, an error signal is generated and commands both computers to ignore all other instruction from the duplexing control unit until after the difficulty has been corrected and the operator has reset the flip-flop 96 by the application of a signal to its reset terminal R.

*Summary*

The computer duplexing system described involves the automatic monitoring of the conditions of both of two computers, and selectively causes an interruption of the programs in the computers in the event of a transition of a computer from one state to another, and selectively issues appropriate status and command signals to both computers for controlling their operation. The system includes means for detecting a malfunction in the automatic duplexing control unit itself, and in response thereto to command both computers to ignore the automatic duplexing control unit. The system is capable of continuous operation in the performance of a continuous on-line function with a very high degree of reliability.

What is claimed is:

1. In an automatic computer duplexing system operable with one of two computers on-line and the other standing by, the combination of
    validation signal generating means in each computer for repeatedly generating signals indicative of on-line and standby conditions in the respective computers,
    operation control means in each computer, and
    a duplexing control unit connected to receive said validation signals from both computers, and operative in the event of a discontinuance of said validation signal from said on-line computer to recognize a malfunctioning in the on-line computer and in response thereto to apply signals to the operation control means of the computers to automatically cause the standby computer to replace the malfunctioning on-line computer.

2. In an automatic computer duplexing system operable with one of two computers on-line and the other standing by, the combination of
    validation signal generating means under program control in each computer for repeatedly generating program validation signals indicative of on-line and standby conditions in the respective computers,
    operation control means in each computer, and
    a duplexing control unit connected to receive said program validation signals from both computers, and operative at a predetermined time following a discontinuance of a validation signal from said on-line computer to recognize a malfunctioning in the on-line computer and in response thereto to apply signals to the operation control means of the computers to automatically cause the standby computer to replace the malfunctioning on-line computer.

3. The combination of two computers each including validation signal generating means for generating program validation signals indicative of on-line, standby and failed operating conditions in the respective computer, program control means, and input-output switches for connecting common input-output devices with the respective computer, and
    a duplexing control unit connected to receive said program validation signals from both computers, and operative on the discontinuance for a predetermined time period of an on-line signal or on the receipt of a failed signal to supply signals to said program control means, and said input-output switches.

4. The combination of two computers each including validation signal generating means under program control for generating program validation signals indicative of on-line standby and failed operating conditions in the respective computer, program interrupt means, command and status means for controlling the operation of the computer after its previous program is interrupted, and input-ouput switches for connecting common input-output devices with the respective computer, and
    a duplexing control unit connected to receive said program validation signals from both computers, and operative on the discontinuance for a predetermined time period of an on-line signal or on the receipt of a failed signal to supply signals to said program interrupt means, said command and status means, and said input-output switches.

5. The combination of two computers each including validation signal generating means under program control for generating program validation signals indicative of operating conditions in the respective computer, and including program control means,
    duplexing control means connected to receive said program validation signals from both computers and operative to supply signals to said program control means, and
    error or malfunction detection means responsive to inconsistent conditions in said duplex control means and operative to supply a signal to said program control means in both computers, whereby the computers ignore all other signals from said duplexing control means.

6. The combination of two computers each including validation signal generating means for generating validation signals indicative of on-line, standby and failed operating conditions in the respective computer, program interrupt means, command and status means for controlling the operation of the computer after its previous program is interrupted, and input-output switches for connecting common input-output devices with the respective computer, and
    a duplexing control unit connected to receive said validation signals from both computers, and operative on the discontinuance for a predetermined time period of an on-line signal or on the receipt of a failed signal to detect a change in operating conditions in a computer and in response thereto to apply signals to the program interrupt means of the computers, to apply command and status signals to the command and status means in the computers, and to apply interlocked enabling signals to said input-output switches.

7. The combination of two computers each including validation signal generating means under program control for generating program validation signals indicative of normal, standby and failed conditions in the respective computer, program interrupt means, command and status means for controlling the operation of the computer after its previous program is interrupted, and input-output switches for connecting common input-output devices with the respective computer, and
    a duplexing control unit connected to receive said program validation signals from both computers, and operative on the discontinuance for a predetermined time period of an on-line signal or on the receipt of a failed signal to detect a change in operating conditions in a computer and in response thereto to generate and direct signals to the program interrupt means of the computers, to generate and direct command and status signals to the command and status means in the computers, and to generate and direct interlocked enabling signals to said input-output switches.

8. The combination of two computers each including validation signal generating means under prorgam control for generating program validation pulses indicative of normal, standby and failed conditions in the respective computer, program interrupt means, command and status means for controlling the operation of the computer after its previous program is interrupted, and input-output switches for connecting common input-output devices with the respective computer, a duplexing control means connected to receive said program validation pulses from both computers, and operative on the discontinuance for a predetermined time period of an on-line signal or on the receipt of a failed signal to detect a change in operating conditions in a computer and in response thereto to apply signals to the program interrupt means of the computers, to apply command and status signals to the command and status means in the computers, and to apply interlocked enabling signals to said input-output switches, and error detection means responsive to inconsistent conditions in said duplex control means and operative to apply a signal to said command and status means in both computers, whereby the computers ignore all other signals from said duplex control means.

9. In a duplexing system wherein there are two computers each including validation pulse generating means under program control for generating program validation pulses indicative of normal on-line, standby and failed conditions in the respective computer, and computer control means, the combination of means connected to receive said program validation pulses from both computers and operative to generate a "standby" signal on the repeated occurrence with at least a predetermined frequency of said standby pulses and the absence of said failed pulses from a standby one of said computers, and to generate an "on-line" signal on the repeated occurrence with at least a predetermined frequency of said normal pulses and the absence of said failed pulses from the other on-line one of said computers, and means responsive to the termination of said "on-line" signal to apply signals to the computer control means to automatically cause the standby one of the computers to replace the other computer in the on-line condition.

10. In a system wherein there are two computers each including validation pulse generating means under program control for generating program validation pulses indicative of normal on-line, standby and failed conditions in the respective computer, and program control means, the combination of means connected to receive said program validation pulses from both computers and operative to generate a "standby" signal level on the repeated occurrence with at least a predetermined frequency of said standby pulses and the absence of said failed pulse from a standby one of said computers, and to generate an "on-line" signal level on the repeated occurrence with at least a predetermined frequency of said normal pulses and the absence of said failed pulse from the other on-line one of said computers, and means responsive to the termination of said "on-line" signal level to apply signals to the program control means to automatically cause the standby one of the computers to replace the other computer in the on-line condition.

11. In a system wherein there are two computers each including validation pulse generating means under program control for generating program validation pulses indicative of normal on-line, standby and failed conditions in the respective computer, program interrupt means, command and status means for controlling the operation of the computer after its previous program is interrupted, and input-output switches for connecting common input-output devices with the respective computer, the combination of means connected to receive said program validation pulses from both computers and operative to generate a "standby" signal level on the repeated occurrence with at least a predetermined frequency of said standby pulses and the absence of said failed pulse from a standby one of said computers, and to generate an "on-line" signal level on the repeated occurrence with at least a predetermined frequency of said normal pulses and the absence of said failed pulse from the other on-line one of said computers, and means responsive to the termination of said "on-line" signal level to apply signals to the program interrupt means, the command and status means and the input-output switches of both computers, whereby automatically to cause the standby one of the computers to replace the other computer in the on-line condition.

12. The combination of two computers each including validation pulse generating means under program control for generating program validation pulses indicative of normal on-line, standby and failed conditions in the respective computer, program interrupt means, command and status means for controlling the operation of the computer after its previous program is interrupted, and input-output switches for connecting common input-output devices with the respective computer, means connected to receive said program validation pulses from both computers and operative to generate a "standby" signal level on the repeated occurrence with at least a predetermined frequency of said standby pulse and the absence of said failed pulse from a standby one of said computers, and to generate an "on-line" signal level on the repeated occurrence with at least a predetermined frequency of said normal pulse and the absence of said failed pulse from the other on-line one of said computers, and means responsive to the termination of said "on-line" signal level to apply signals to the program interrupt means, the command and status means and the input-output switches of both computers, whereby automatically to cause the standby one of the computers to replace the other computer in the on-line condition.

13. The combination of two computers each including validation pulse generating means under program control for generating program validation pulses indicative of normal on-line, standby and failed conditions in the respective computer, program interrupt means, command and status means for controlling the operation of the computer after its previous program is interrupted, and input-output switches for connecting common input-output devices with the respective computer, a duplexing control unit including means connected to receive said program validation pulses from both computers and operative to generate a "standby" signal level on the repeated occurrence with at least a predetermined frequency of said standby pulses and the absence of said failed pulse from a standby one of said computers, and to generate an "on-line" signal level on the repeated occurrence with at least a predetermined frequency of said normal pulses and the absence of said failed pulse from the other on-line one of said computers, and means responsive to the termination of said "on-line" signal level to apply signals to the program interrupt means, the command and status means and the input-output switches of both computers, whereby automatically to cause the standby one of the computers to replace the other computer in the on-line condition, and error detection means responsive to inconsistent conditions in said duplexing control unit and operative to apply a signal to said command and status means in both computers to cause the computers to ignore all other signals from said duplex control unit.

References Cited by the Examiner

UNITED STATES PATENTS

| | | | |
|---|---|---|---|
| 2,932,005 | 4/1960 | Brightman | 340—146.1 |
| 2,945,915 | 7/1960 | Strip | 340—146.1 |
| 3,027,542 | 3/1962 | Silva | 340—146.1 |
| 3,135,946 | 6/1964 | Miller et al. | 340—146.6 |

OTHER REFERENCES

Pages 76–83, March 1963, H. Nagler, "Revovery for Computer Switchover in a Real Time System," IBM Systems Journal, vol. 2.

Pages 46 to 52, December 1959—S. K. Chao and G. Rocheleau, "Duplexing Mobidic Computers," Automatic Control.

MALCOLM A. MORRISON, *Primary Examiner.*

ROBERT C. BAILEY, *Examiner.*

M. P. ALLEN, K. MILDE, *Assistant Examiners.*